United States Patent [19]

Murayama et al.

[11] Patent Number: 4,847,642
[45] Date of Patent: Jul. 11, 1989

[54] ELECTROPHOTOGRAPHIC APPARATUS

[75] Inventors: Yasushi Murayama, Tokyo; Kazunori Kanekura; Tomohiro Aoki, both of Yokohama; Kazuyoshi Chiku, Tokyo; Yoshihiko Hirose; Takashi Uchida, both of Yokohama; Kunihiko Matsuzawa, Kawasaki, all of Japan

[73] Assignee: Canon Kabushiki Kaisha, Tokyo, Japan

[21] Appl. No.: 149,526

[22] Filed: Jan. 28, 1988

[30] Foreign Application Priority Data

Jan. 30, 1987 [JP] Japan ............................. 62-12253[U]

[51] Int. Cl.⁴ ............................................. G01J 15/00
[52] U.S. Cl. ................................... 346/157; 346/160
[58] Field of Search ................. 346/157, 160, 107 R, 346/108; 400/119; 358/300, 302; 350/6.7, 6.8, 6.9, 6.91

[56] References Cited

U.S. PATENT DOCUMENTS 4,700,201 10/1987 Sato ..................................... 346/160

Primary Examiner—Arthur G. Evans
Attorney, Agent, or Firm—Fitzpatrick, Cella, Harper & Scinto

[57] ABSTRACT

An electrographic apparatus includes a plurality of photosensitive members, a plurality of laser projecting devices for projecting deflecting laser beams for scanning the photosensitive members, the laser projecting devices being provided for the respective photosensitive members, mirrors for receiving the laser beams projected from the laser projecting devices and reflecting them in a substantially reverse direction to scan the photosensitive members with the reversed laser beams, the mirrors being provided for the respective laser projecting devices. The apparatus may further includes adjusting devices, provided for the respective mirrors, for adjusting relative positions between the photosensitive members and associated ones of the mirrors.

22 Claims, 14 Drawing Sheets

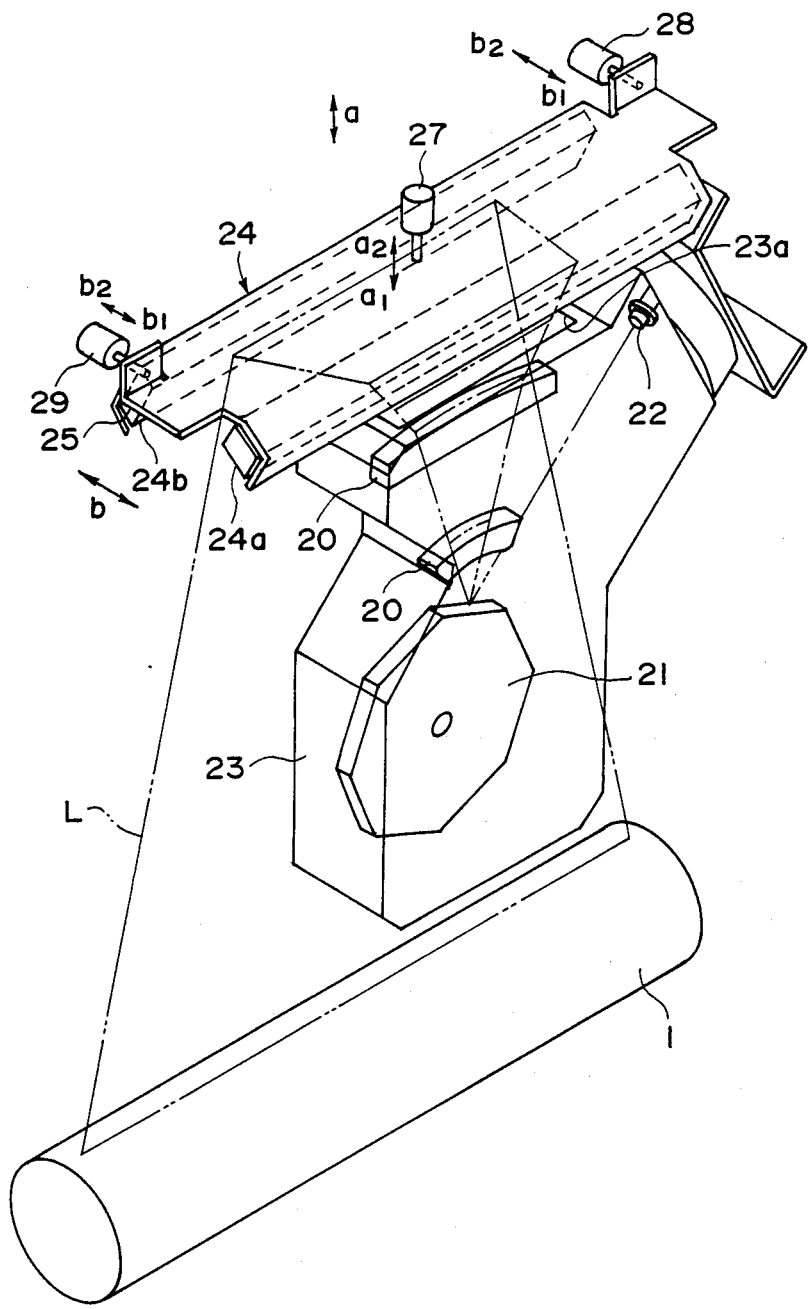
F I G. 2

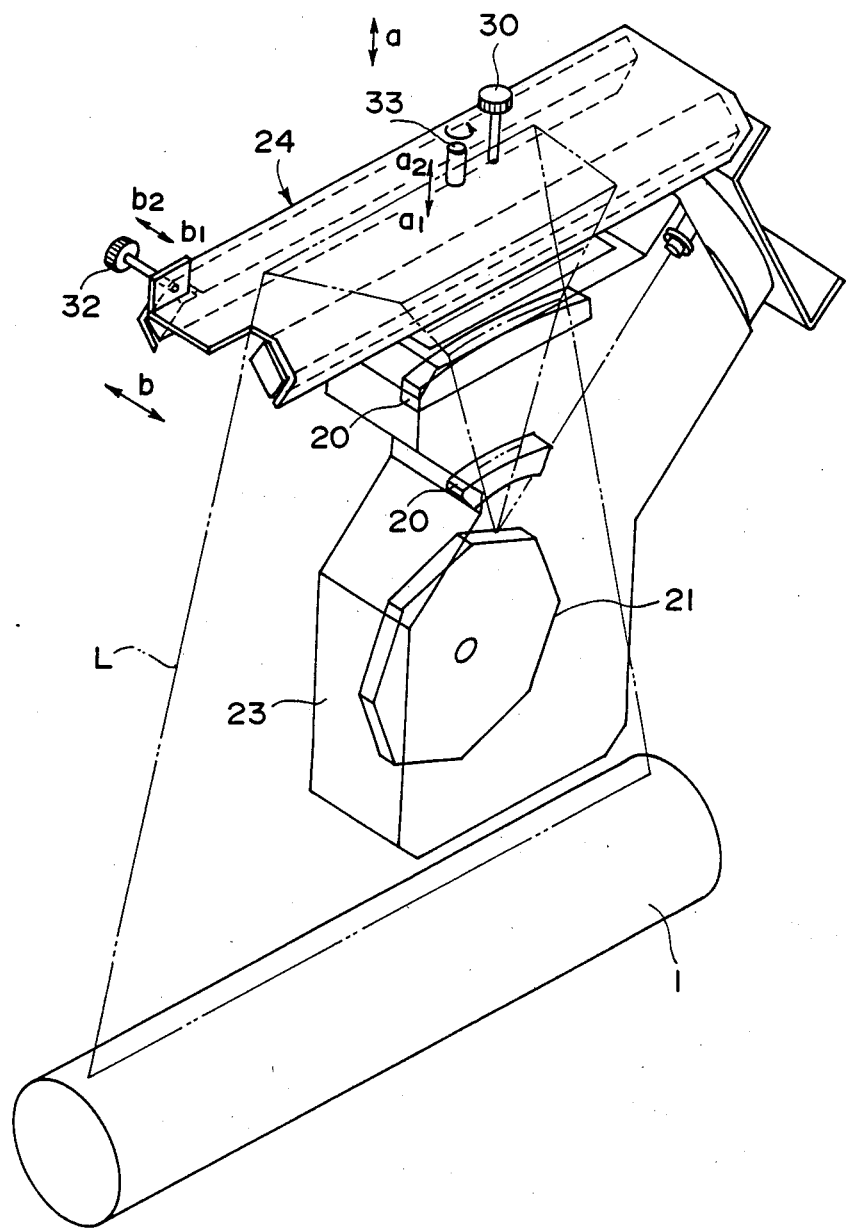
F I G. 6A

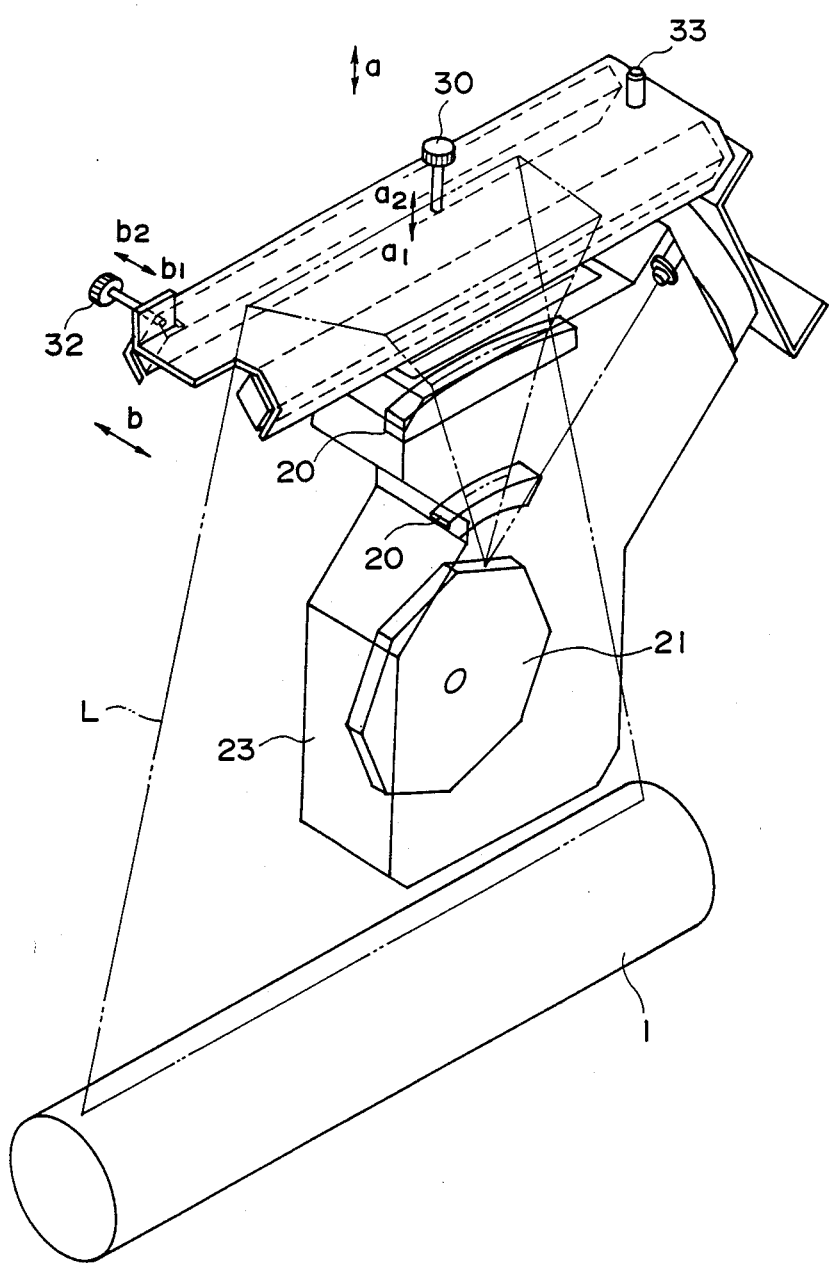
F I G. 6B

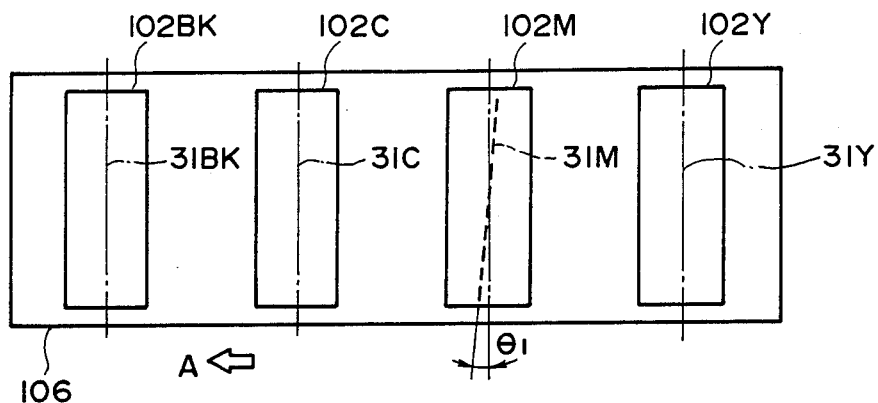
F I G. 11A
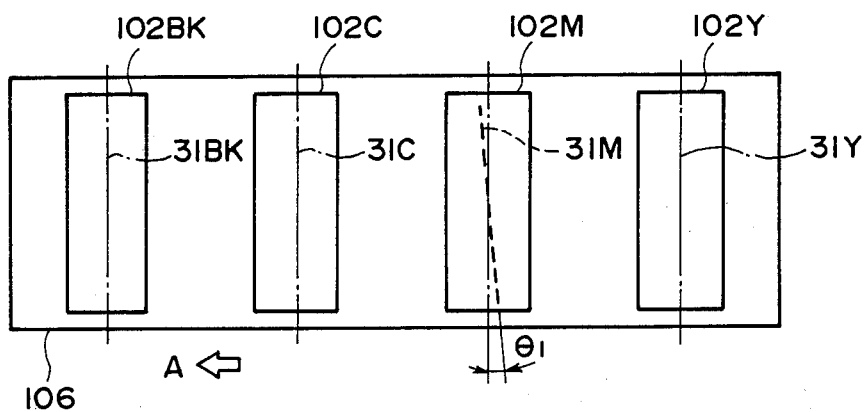
F I G. 11B
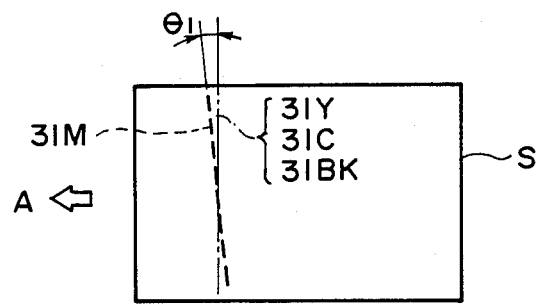
F I G. 11C

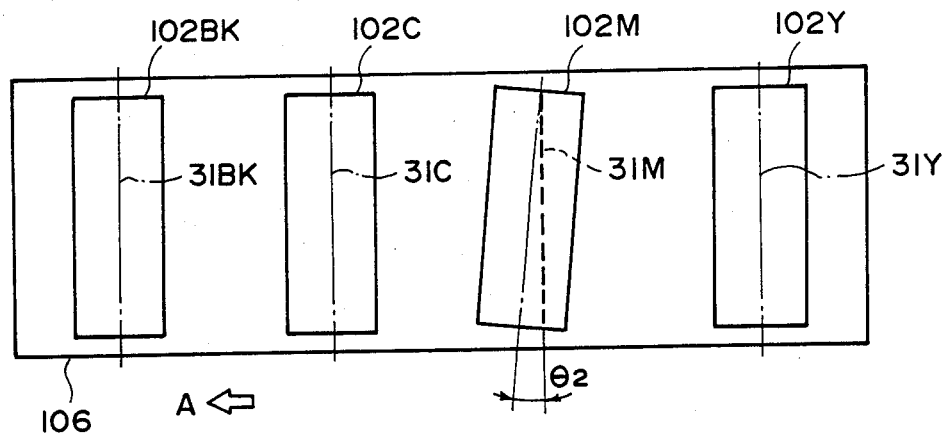
F I G. 12A
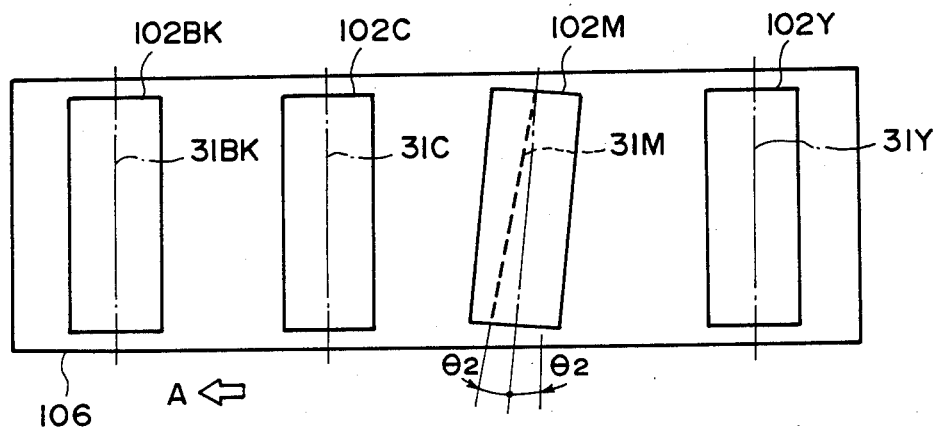
F I G. 12B
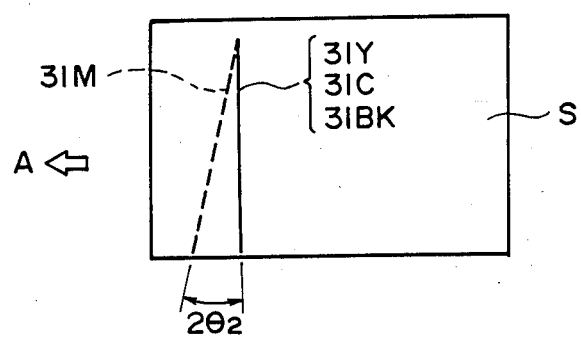
F I G. 12C

ELECTROPHOTOGRAPHIC APPARATUS

FIELD OF THE INVENTION AND RELATED ART

The present invention relates to an electrophotographic apparatus wherein a photosensitive member is scanned by a laser beam, more particularly to an electrophotographic apparatus provided with plural photosensitive members and plural laser emitting means.

It has been proposed to provide an electrophotographic apparatus with a plurality of photosensitive members so as to give it multi-functions and so as to increase a process speed, the photosensitive members being scanned by laser beams.

As an example, U.S. Pat. Nos. 4,531,828 or 4,660,007, discloses an apparatus wherein developed images are formed on the respective photosensitive drums in different colors, and the developed images are superposedly transferred onto the same recording material to produce a color image.

Referring to FIG. 9, there is shown an example of such an electrophotographic apparatus of an electrostatic type, which comprises four photosensitive drums. The apparatus includes image forming stations 101Y, 101M, 101C and 101BK for yellow, magenta, cyan and black colors, respectively. Each of the image forming stations 101Y, 101M, 101C and 101BK includes light scanning means 103Y, 103M, 103C or 103BK for projecting onto the associated photosensitive drum a laser beam which has been modulated in accordance with information of the image to be recorded which is being scanningly deflected on a line to scan it and, a developing device and a cleaning device. A transfer material S is transported in a direction indicated by an arrow A by a transfer belt 106, and it receives yellow, magenta, cyan and black images 31Y, 31M, 31C and 31BK sequentially to form a color image. In this type of the apparatus in which the photosensitive member is line-scanned, it is required that the laser beam is deflected for the line scan. Generally, the laser beam deflection makes use of a galvano mirror, a rotational polygonal mirror, a phologram scanner or the like. However, an angle of deflection covered is more or less limited in any types of the deflecting devices. Because of this, in order to increase the scanning range, it is necessary to increase the distance from the scanning means to the photosensitive member. Therefore, in the apparatus shown in FIG. 9, the height of the apparatus is necessarily increased.

SUMMARY OF THE INVENTION

Accordingly, it is a principal object of the present invention to provide an electrostatic photographic apparatus in which the scanning range is increased without increasing the size of the apparatus.

It is another object of the present invention to provide an electrostatic photographic apparatus wherein plural images are superimposed without misregistration.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a perspective view of a part of FIG. 1 apparatus.

FIGS. 6A and 6B are perspective views of parts of image forming apparatuses according to further embodiments of the present invention.

FIGS. 11A, 11B and 11C illustrate image misregistration resulting from a positional deviation of light scanning devices.

FIGS. 12A, 12B and 12C illustrate image misregistration resulting from deviation of axes of photosensitive drums.

DESCRIPTION OF THE PREFERRED EMBODIMENTS

Figure 1:
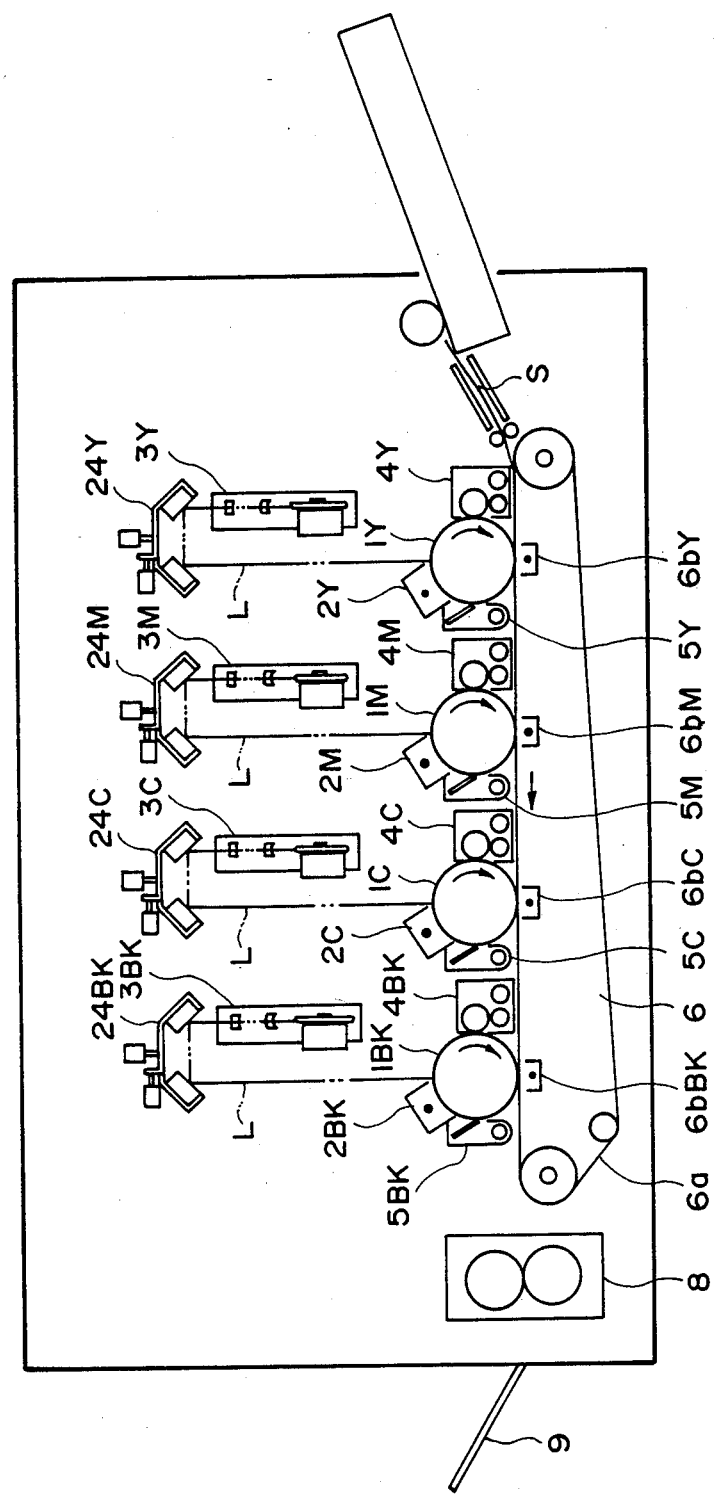
FIG. 1 is a somewhat schematic sectional view of an electrophotographic apparatus according to an embodiment of the present invention.

Referring now to FIG. 1, there is shown a full-color type electrophotographic apparatus according to an embodiment of the present invention, wherein four photosensitive drums are contained. The apparatus includes image forming stations provided with photosensitive drums 1Y, 1M, 1C and 1BK for yellow, magenta, cyan and black color image formations, respectively. Each of the photosensitive drums 1Y, 1M, 1C and 1BK is rotatable in a direction indicated by an arrow. Around each of the photosensitive drum 1Y, 1M, 1C or 1BK, there are disposed a primary charger 2Y, 2M, 2C or 2BK for uniformly charging the associated photosensitive drum, a scanning optical means 3Y, 3M, 3C or 3BK for writing image information on the photosensitive member (a latent image forming means), a developing device 4Y, 4M, 4C or 4BK for visualizing the associated latent image into a toner image which contains a yellow, magenta, cyan or black developer, a cleaning device 5Y, 5M, 5C or 5BK and a transfer charger 6B, 6Y, 6BM, 6BC or 6BK for transferring the associated image onto a transfer material. The transfer material S is carried on a transfer belt 6a and is conveyed in a direction indicated by an arrow A, so that it receives toner images sequentially at the respective image forming stations, whereby a color image is formed thereon. After the image transfer steps are completed, the combined image is fixed by an image fixing device 8, and then, the transfer material is discharged onto a tray 9.

As shown in FIG. 2, each of the scanning optical devices 3Y, 3M, 3C and 3BK is provided with an imaging lens 20 having an f-θ property, a deflecting mirror 21 (polygonal mirror) which receives a laser beam along a straight line and which reflects the laser beam for scan on a line and a laser source 22 having a semiconductor laser and a collimator lens, in this embodiment. Those elements are mounted at predetermined positions in an optical casing 23. The light beam L emitted from the laser source 22 is scanningly reflected by the polygonal mirror 21 and is emitted through an opening 23a of the optical casing 23 after passing through the f-θ lens 20.

Above the optical casing 23, a reflector 24 functioning as a light reflecting means is mounted which includes a first mirror 24a and a second mirror 24b which are opposed to each other at substantially right angles. The first reflecting mirror 24a is opposed to the opening 23a and is fixed to a frame of the apparatus (not shown). In this structure, the laser beam L emitted from the optical casing 23 is reflected by the first reflecting mirror 24a and then the second reflecting mirror 24b, whereby the laser beam L is folded back and is directed to the photosensitive drum.

When the image forming apparatus includes plural image forming stations, adjustment of the laser beams is important.

Inventors have particularly noted the fact that spaces are required between adjacent photosensitive members and that the laser beam is very fine, and they have achieved a long optical path for the laser beam by folding it by reflecting mirror means.

Since the scanning optical device providing deflecting laser beams between scanning positions for the photosensitive members in the adjacent image forming stations, the optical paths in the respective image forming stations are completely independent from each other. And, there is no overlapping between image forming stations without disturbing the independency among them, and still the optical path length can be increased without increasing the height of the apparatus. Additionally, the scanning optical devices are disposed at positions which have conventionally been vacant spaces. Also, the scanning optical devices are disposed between the associated mirror means and photosensitive members. Therefore, the apparatus does not become bulky in the direction of transportation of the recording material.

Next, a description will be made as to the fact that another problem has been solved according to this embodiment. In an apparatus including plural image forming stations, different color images are transferred onto the same surface of the same transfer material S sequentially, and therefore, if the position of the image transfer stations are deviated from the respective predetermined positions, those color images are deviated or overlapped in the case of a superimposing image formation; and a different hue results in the case of full color image formation to such an extent of color image misregistration, thus remarkably degrading the image quality.

Figures 10A, 10B, 10C, 10D:
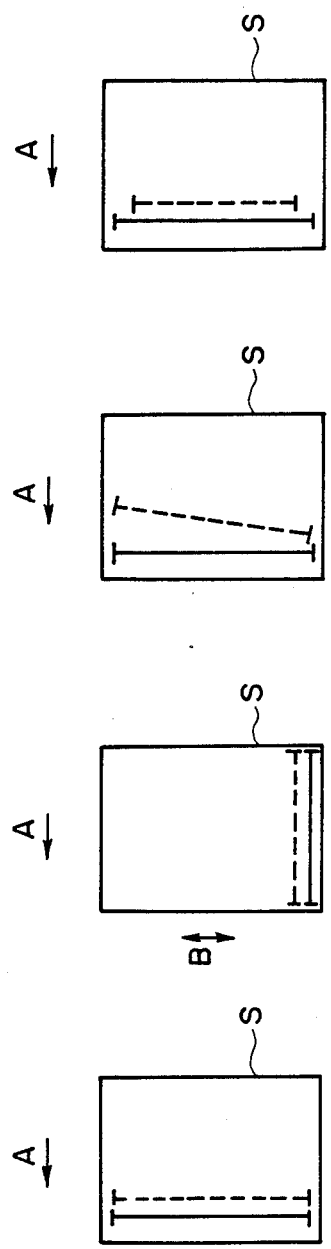
FIGS. 10A, 10B, 10C and 10D illustrate image misregistration.

Referring to FIGS. 10A, 10B, 10C and 10D there are shown various causes of deviations of the transferred images. FIG. 10A illustrates a longitudinal deviation, i.e. a deviation in a direction A of the transfer material transportation (top margin); FIG. 10B, a lateral deviation, i.e. a deviation in a direction B of the laser beam scanning (left margin); FIG. 10C inclination; and FIG. 10D an error in magnification. In actual images, those deviations are contained in combination.

Figure 13:
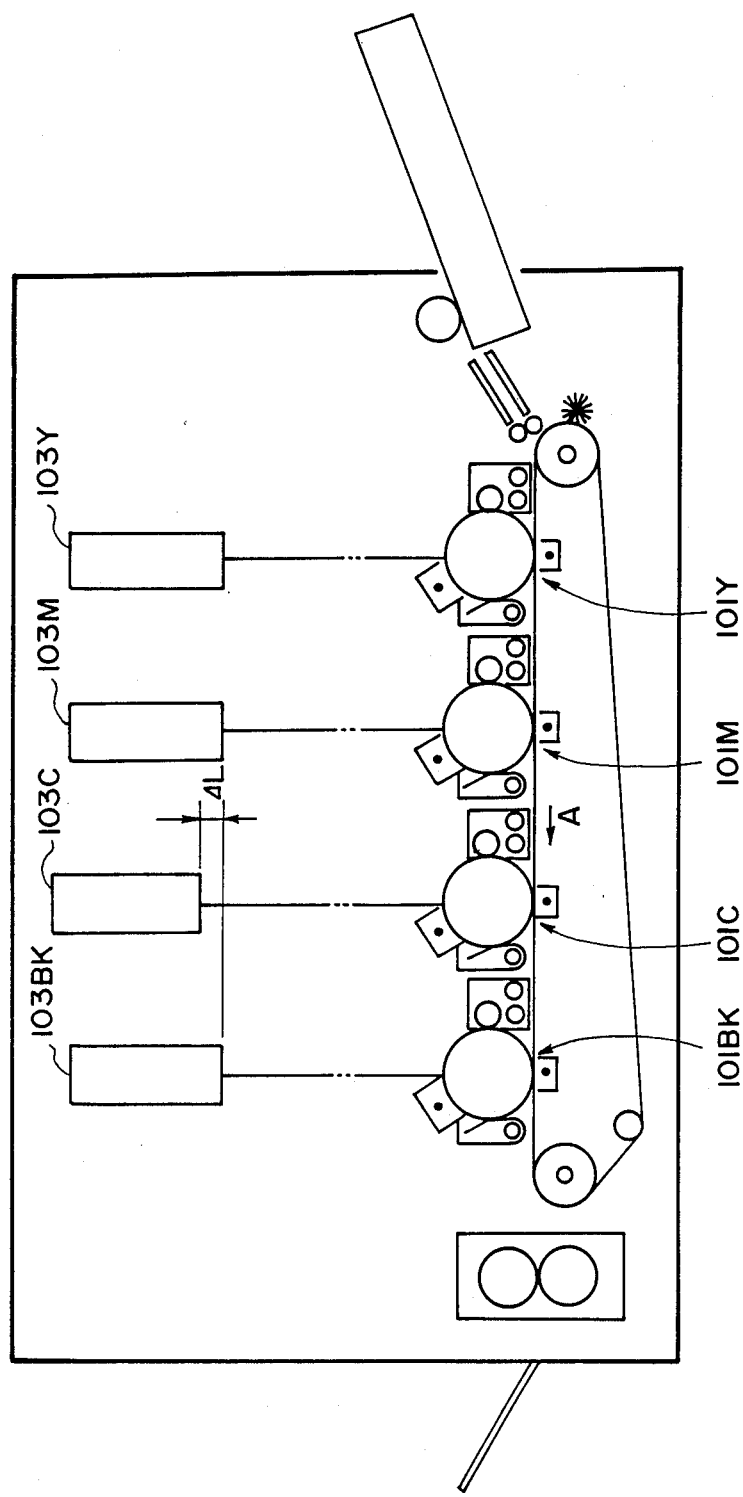
FIG. 13 is a somewhat schematic sectional view of an apparatus illustrating an optical path length difference.
Figure 14:
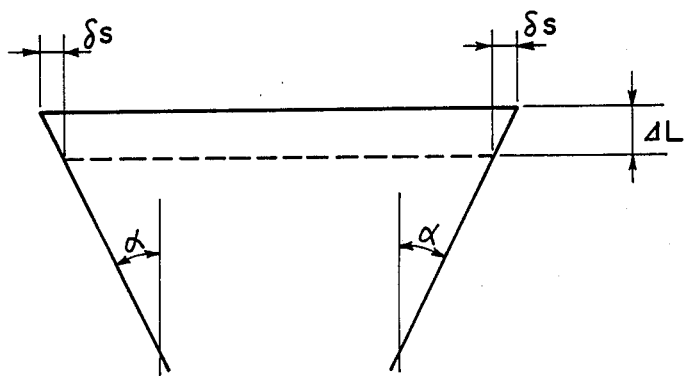
FIG. 14 illustrates a magnification error resulting from the optical path length difference.

The top margin deviation shown in FIG. 10A is mainly attributable to a deviation of the timing of the start of the image writing in an image forming station or stations. The left margin deviation shown in FIG. 10B is attributable to a deviation of a start timing of the image writing in a scanning line or lines. The inclination shown in FIG. 10C is caused by a deviation in a mounting angle $\theta_1$ of the scanning optical system (formed in the order of FIGS. 11A, 11B and 11C which will be described hereinafter) or by an angular deviation $\theta_2$ of the rotational axis of the photosensitive drum (formed in the order of FIGS. 12A, 12B and 12C which will be described hereinafter). The magnification error shown in FIG. 10D is attributable to an error $\Delta L$ of the optical path length on the scanning optical system to the photosensitive member in the image forming station, which results in a deviation in the scanning line length $2 \times \Delta S$, as will be understood in conjunction with FIGS. 13 and 14 which will be described hereinafter.

The methods of correcting the four deviations will be described. As to the top margin deviation and the left margin deviation, the timing of the beam scan is electrically adjusted. However, in order to avoid the inclination deviation and the magnification error, it is required that the scanning optical devices and the photosensitive drums are mounted into the frame of the apparatus with greatest care about the mounting positions and angles.

The top margin deviation and the left margin deviation are electrically adjustable, and therefore, they can be almost completely removed. However, to remove the inclination deviation and the magnification error which are depending on the mounting position or angle, the scanning means and the photosensitive drum have been corrected by changing the mounting positions and mounting angles of the scanning means, the photosensitive drum and the reflecting mirror or mirrors in the optical path. However, with those adjustments, the inclination of the scanning line and the magnifications are simultaneously changed, and therefore, the adjustment is so difficult as to require great efforts.

In the embodiment shown in FIGS. 1 and 2, the problems are solved by providing the folding reflecting mirror 24 with adjusting means.

The reflecting mirror 24 is adjustable in its mounting position in a direction a and also in a direction b independently from each other. To allow the adjustment, an adjusting means is provided which includes actuators 27, 28 and 29 in the form of a linear step actuator having a step motor (driving source) for providing a stepwise rectilinear movement.

By driving the actuator 27 in a direction a1 which is codirectional of the light beam L emission from the optical device, the reflector 24 is displaced in a direction substantially parallel to the direction a to reduce the optical path length to the photosensitive drum 1 by driving the actuator 27 in a direction a2, the optical path length can be increased. By adjusting the optical path length in this manner, the length of the line to be scanned on the photosensitive drum by the light beam L can be changed from m0 to m1, shown in FIG. 3A.

Figures 3A, 3B, 3C:
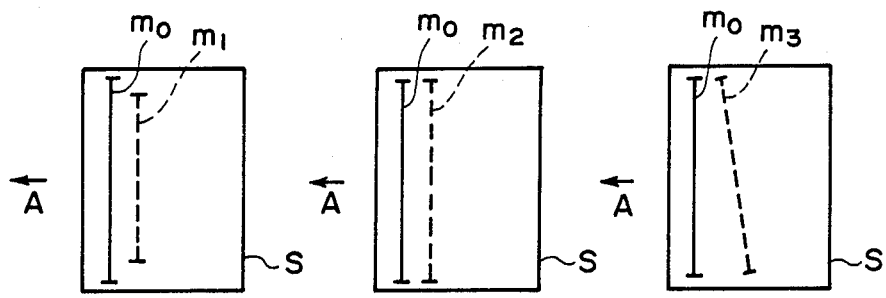
FIGS. 3A, 3B and 3C illustrate misregistration of images.

By driving the actuators 28 and 29 simultaneously in the same direction, b1, for example, the reflector 24 is translated in a direction b which is substantially perpendicular to the direction a1. By this, as shown in FIGS. 3B, the scanning line position can be translationally shifted from m0 position to m2 position. When only one of the actuators 28, 29 or when the actuator 28 is driven in the direction b1, while at the same time the actuator 29 is driven in the opposite direction b2, that is, when the actuators are driven in the opposite directions, the inclination may be changed from the scanning line m0 to the scanning line m3 as shown in the FIG. 2C.

As described in the foregoing, according to this embodiment of the present invention, a reflector 24 for folding back the laser beam is disposed in the light beam optical path between the optical scanning device to the photosensitive drum, wherein the position and/or pose of the reflector 24 is adjusted by an actuator 27 and/or actuators 28 and 29 to adjust the optical path length and/or the scanning position by the scanning beam, independently from each other. More particularly, by shifting the reflector 24 including a pair of reflecting mirrors disposed at substantially right angles, only the optical path length of the light beam L can be corrected without changing the position of the scanning line imaged on the photosensitive drum. And, by shifting the reflector 24 in the direction b, the position and the angle of the imaging on the photosensitive drum can be corrected without changing the optical path length for the light beam L.

Further in this embodiment, 4-drum color printer is provided with a reflector and a position adjusting means for the reflector for each of the drums, so that the inclination of the scanning line on the photosensitive drum and the magnification variation due to the optical path length difference are corrected for each of the image forming stations, independently from each other, whereby color image misregistration among different color images to be sequentially transferred onto the transfer material S is removed.

Figures 4A, 4B, 4C:
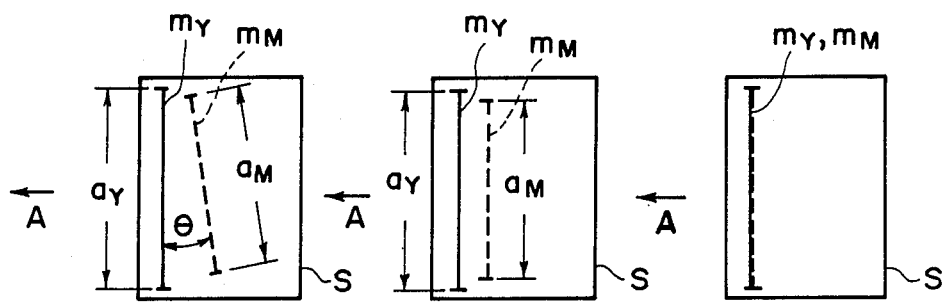
FIGS. 4A, 4B and 4C illustrate a process of correcting the image misregistration.

Referring to FIG. 4, an actual adjustment process will be described. For example, when the misregistration of the color images in four full color image formation is to be corrected, one reference station, a yellow color image forming station, in this embodiment is selected, and each of the other image forming stations is adjusted so as to be aligned with the yellow image forming station. Then, an image deviation of the magenta image mM relative to the yellow image mY is measured. To accomplish this, a reference original having two parallel lines perpendicular to a direction of the transfer material transportation A is recorded sequentially on the same transfer material S in the yellow and magenta image forming stations. If it turns out that the magenta image mM is deviated from the reference yellow image mY in the angle (deviation $\theta$) and in the scanning line length due to a magnification error (the yellow image mY has a scanning length aY) whereas the magenta image mM has a scanning length aM, wherein aY is larger than mM, the angular deviation $\theta$ is first corrected using actuators 28 and 29. Then, the same image recording operation is performed, and the recorded transfer material S is observed to confirm whether the transferred images mY and mM are parallel or not this is repeated until the parallelism is achieved. When they become parallel, the correction of the angular deviation $\theta$ is completed. Subsequently, the optical path length for the light beam L is changed by the above described actuator 27 (to increase the length in this example) to increase the scanning range on the photosensitive drum. Then, the image forming operation is performed on a transfer sheet S, and the length of the images aY and aM are observed. By repeating the above described operation, aY=aM is achieved, and then the correction of the magnification error is completed.

If an image of one straight line is recorded as a reference image after the above described correcting operations, the yellow image mY and the magenta image mM are completely superposed.

Subsequently, a cyan image is corrected relative to the yellow image; and then a black image is corrected to the yellow image in the same manner as with the magenta image, whereby the misregistration of the four color transferred images can be removed.

Figure 5:
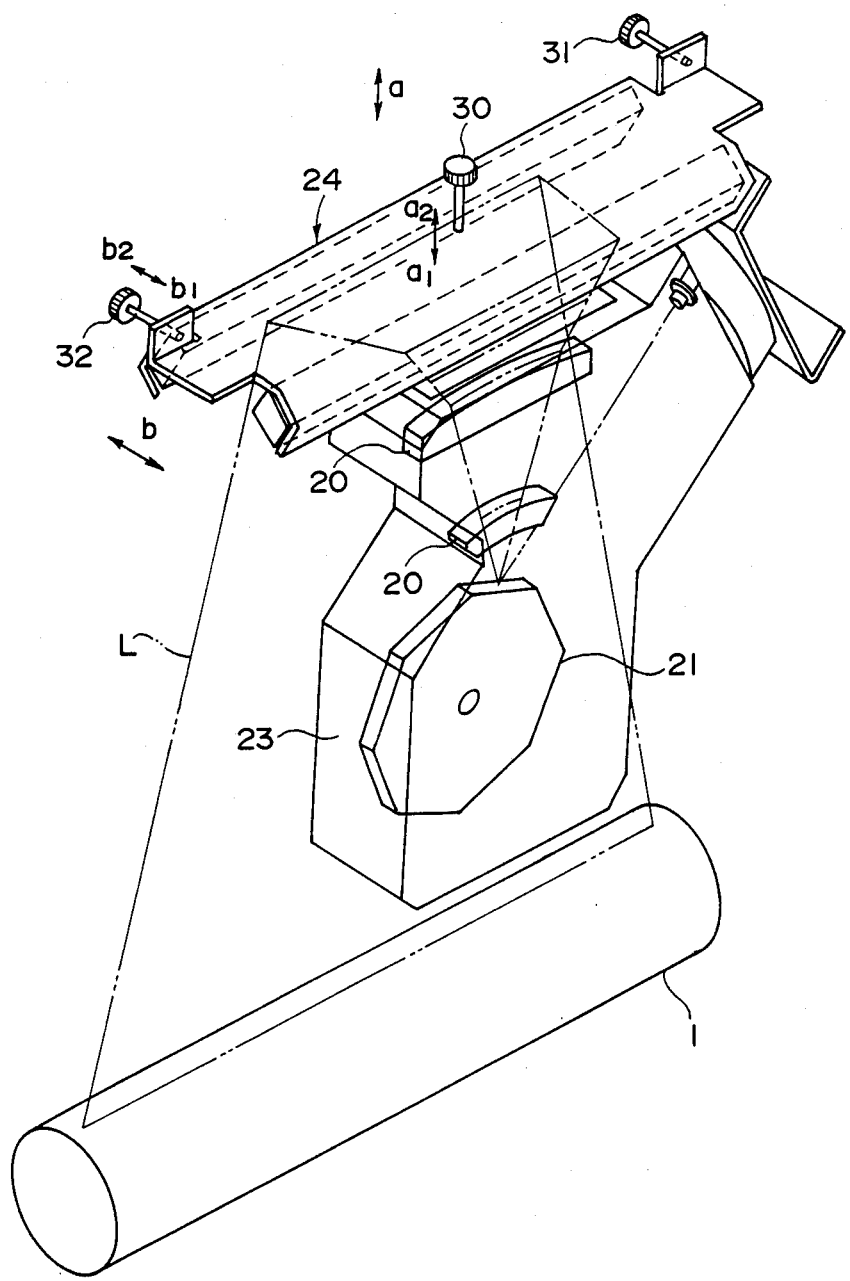
FIG. 5 is a perspective view of an electrophotographic apparatus according to another embodiment of the present invention.

Referring to FIG. 5, another embodiment of the present invention will be described. In the foregoing embodiment, stepping motors are employed in the adjustment of the reflector. However, in this embodiment, a manually drivable screw mechanism 30, 31 and 32 are used. Since the other structures of this embodiments are substantially the same as the FIG. 2 embodiment, the detailed explanation is omitted by assigning the same reference numerals to the corresponding elements.

Referring to FIGS. 6A and 6B, a further embodiment of the present invention will be described. The structure of the actuator (adjusting means) for the direction a is the same as with the FIG. 5 embodiment, that is, screw mechanism 30 is employed. However, the actuator for the b direction adjustment is performed by a combination of a screw mechanism 32 and a central shaft 33 for rotating the reflector. That is, in FIG. 6A, by adjusting the screw mechanism 32 in the direction b, the reflector 24 rotates about a shaft 33 located substantially at the center of the reflector 24.

In FIG. 6B embodiment, by adjusting the screw mechanism 32 in the direction b, it rotates about a shaft 33 located adjacent an end of the reflector.

In those two embodiments, the optical path length and an angle of the scanning line can be adjusted independently.

Figure 7:
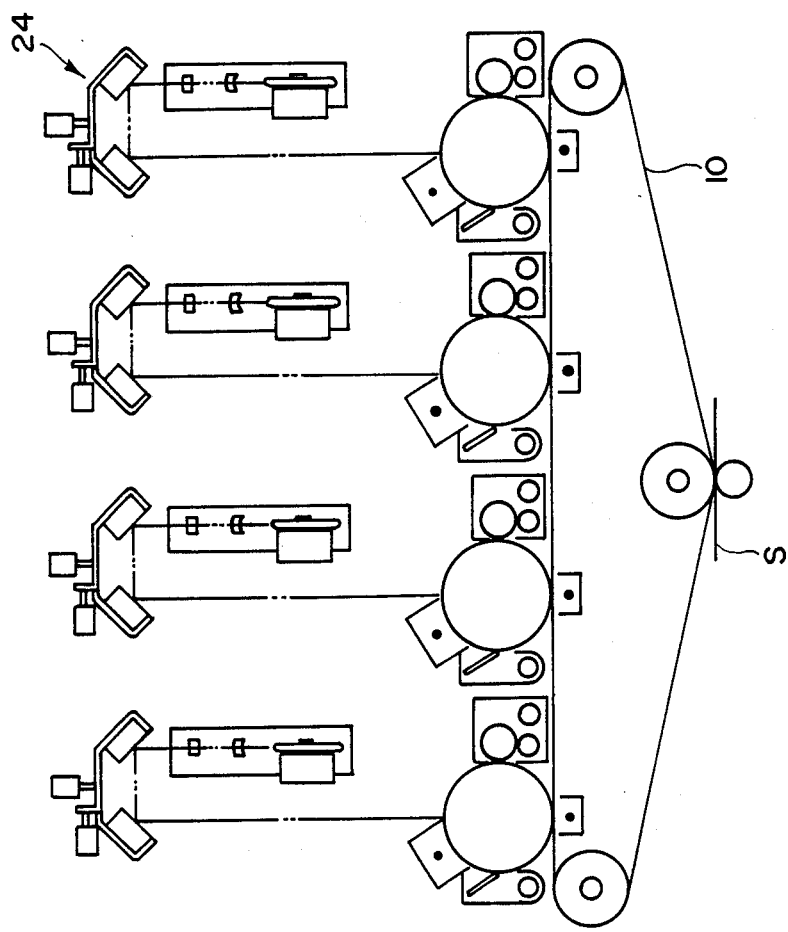
FIGS. 7 and 8 are somewhat schematic sectional views of electrophotographic apparatuses according to other embodiments of the present invention.

FIG. 7 shows an example of an image forming apparatus to which the optical path adjusting means 24 is applicable. The image forming apparatus is provided with an intermediate transfer member 10.

Figure 8:
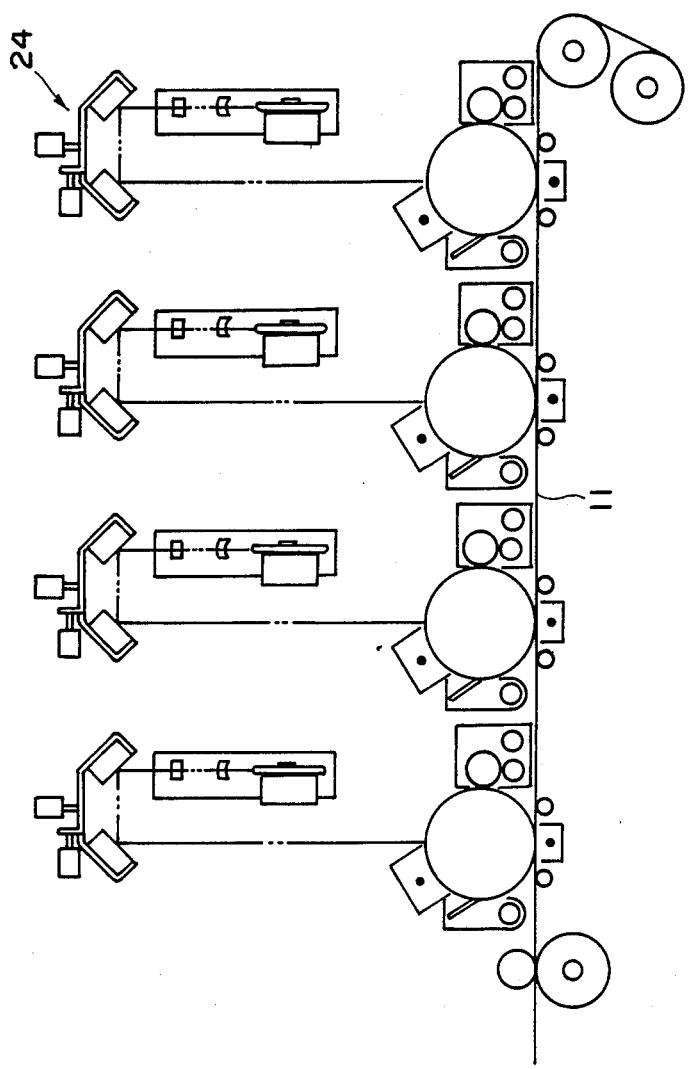
Figure 9:
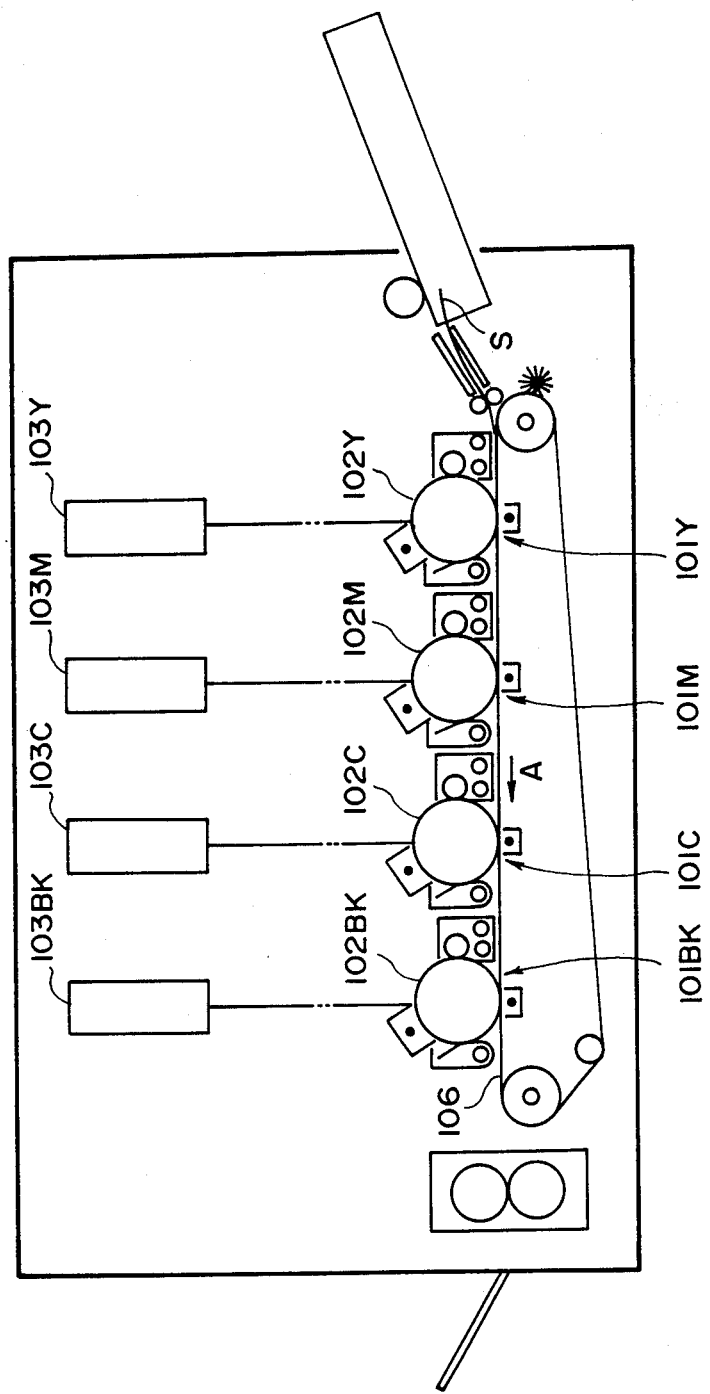
FIG. 9 is a sectional view of a conventional electrophotographic apparatus.

FIG. 8 shows an example of another image forming apparatus to which the adjusting means 24 is applicable. In this image forming apparatus, a rolled paper 11 is employed as a transfer material.

Also, the present invention is applicable not only to the 4-drum color printer but also to a multi-color image forming apparatus (two or three) or to a superimposing image forming apparatus.

Furthermore, the present invention, more particularly, the folded optical path is applicable to an image forming apparatus wherein a single drum is provided, on which a single laser beam projecting means is actable. The space can be saved in this case, too.

In the foregoing embodiments, the optical system includes reflecting mirrors arranged in L-shape. However, the number of the reflecting mirrors and the mounting positions and angles thereof may be changed, provided that the beam is folded back, although the L-shape arrangement is simplest and is easy to obtain the optical accuracy, and therefore, is preferable.

While the invention has been described with reference to the structures disclosed herein, it is not confined to the details set forth and this application is intended to cover such modifications or changes as may come within the purposes of the improvements or the scope of the following claims.

What is claimed is:
1. An electrographic apparatus, comprising:
   a plurality of photosensitive members for superposingly forming a plurality of images on a recording medium;

a plurality of laser projecting means for projecting laser beams for scanning said photosensitive members, each of said plurality of laser projecting means being provided for respective ones of said plurality of photosensitive members; and a plurality of mirror means, each for receiving the laser beam projected from an associated one of said laser projecting means and for reflecting it in a substantially reverse direction substantially parallel to the received direction, to scan said photosensitive members with the reversed laser beams, said mirror means being provided for respective ones of said laser projecting means.

2. An apparatus according to claim 1, wherein each of said mirror means includes a pair of mirrors.

3. An apparatus according to claim 2, wherein said mirrors are arranged in an L-shape.

4. An apparatus according to claim 3, wherein said mirrors are arranged substantially perpendicularly.

5. An apparatus according to claim 1, wherein each of said laser projecting means is disposed between an associated one of said mirror means and an associated one of said photosensitive members.

6. An apparatus according to claim 1, wherein each of said laser beam projecting means includes a laser source for emitting a laser beam and deflecting means for deflecting the laser beam emitted from said laser source to provide a rectilinear scan.

7. An apparatus according to claim 1, further comprising a plurality of developing means for developing latent images formed on the respective photosensitive member, the plural developing means containing different color developers.

8. An apparatus according to claim 7, wherein developed images formed on the plural photosensitive members are transferred sequentially onto one recording material, wherein the images are fixed all at once.

9. An electrographic apparatus, comprising:
a plurality of movable photosensitive members;
a plurality of laser projecting means for projecting laser beams for scanning said photosensitive members, each of said plurality of laser projecting means being provided for respective ones of said plurality of photosensitive members;
a plurality of mirror means, each for receiving the laser beam projected form an associated one of said laser projecting means and for reflecting it in a substantially reverse direction to scan said photosensitive members with the reversed laser beams, said mirror means being provided for respective ones of said laser projecting means; and
adjusting means for adjusting relative positions between said photosensitive members and associated ones of said mirror means.

10. An apparatus according to claim 9, wherein said adjusting means is effective to adjust an optical path length between one of said laser projecting means and an associated one of said photosensitive members.

11. An apparatus according to claim 9, wherein said adjusting means is effective to adjust a position of laser beam scan relative to one of said photosensitive members in a direction of movement of said one of said photosensitive members.

12. An apparatus according to claim 9, wherein said adjusting means is effective to adjust an angle between associated one of said photosensitive members and a scanning line therefor.

13. An apparatus according to claim 9, wherein each of said mirror means included a pair of mirrors.

14. An apparatus according to claim 13, wherein said adjusting means is effective to move the pair of mirrors of at least one of said plurality of mirror means as a unit.

15. An apparatus according to claim 14, wherein said adjusting means includes a first adjusting portion for translating the pair of mirrors and a second adjusting portion for adjusting an angle between a mirror and a direction of movement of associated one of said photosensitive members.

16. An apparatus according to claim 9, wherein said adjusting means includes a motor for moving said mirror means.

17. An apparatus according to claim 13, wherein said mirrors are arranged in an L-shape.

18. An apparatus according to claim 17, wherein said mirrors are arranged substantially perpendicularly.

19. An apparatus according to claim 9, wherein each of said laser projecting means is disposed between an associated one of said mirror means and an associated one of said photosensitive members.

20. An apparatus according to claim 9, wherein each of said laser beam projecting means includes a laser source for emitting a laser beam and deflecting means for deflecting the laser beam emitted from said laser source to provide a rectilinear scan.

21. An apparatus according to claim 9, wherein said adjusting means comprises a plurality of adjusting means, each provided for respective mirror means.

22. An apparatus according to claim 1, further comprising coordinating means for coordinating operation of said plurality of projecting means and said plurality of photosensitive members sequentially to form superposed images on the recording medium, wherein said plurality of photosensitive members, said plurality of laser projecting means, and said plurality of mirror means form a plurality of image forming stations, said image forming stations being disposed in a transport direction of said recording medium.

* * * * *